US012785459B2

(12) United States Patent
Kasar

(10) Patent No.: US 12,785,459 B2
(45) Date of Patent: Nov. 3, 2026

(54) WIRELESSLY CHARGEABLE WEARABLE ELECTRONIC DEVICE AND WIRELESS CHARGING CASE

(71) Applicant: APPLE INC., Cupertino, CA (US)

(72) Inventor: Darshan R. Kasar, Redwood City, CA (US)

( * ) Notice: Subject to any disclaimer, the term of this patent is extended or adjusted under 35 U.S.C. 154(b) by 773 days.

(21) Appl. No.: 18/130,949

(22) Filed: Apr. 5, 2023

(65) Prior Publication Data

US 2023/0291244 A1 Sep. 14, 2023

Related U.S. Application Data

(63) Continuation of application No. PCT/US2021/049762, filed on Sep. 10, 2021.

(60) Provisional application No. 63/091,562, filed on Oct. 14, 2020.

(51) Int. Cl.

| | |
|---|---|
| ***H02J 50/80*** | (2016.01) |
| ***G02C 11/00*** | (2006.01) |
| ***G06F 1/16*** | (2006.01) |
| ***H02J 7/70*** | (2026.01) |
| ***H02J 50/10*** | (2016.01) |
| ***H04B 5/26*** | (2024.01) |

(52) U.S. Cl.

CPC .............. *H02J 50/80* (2016.02); *G02C 11/10* (2013.01); *G06F 1/163* (2013.01); *H02J 7/731* (2026.01); *H02J 50/10* (2016.02); *H04B 5/263* (2024.01); *H04B 5/266* (2024.01)

(58) Field of Classification Search

CPC . H02J 50/80; H02J 50/10; H02J 7/731; H04B 5/263; H04B 5/266; G02C 11/10; G06F 1/163

USPC .......................................................... 307/104

See application file for complete search history.

(56) References Cited

U.S. PATENT DOCUMENTS

| | | | | |
|---|---|---|---|---|
| 7,648,236 | B1 * | 1/2010 | Dobson .................. | G02C 11/06 351/158 |
| 8,976,085 | B2 * | 3/2015 | Olsson ................. | H04N 13/344 345/9 |
| 9,606,358 | B1 * | 3/2017 | Heinrich ............ | G02B 27/0179 |
| 10,261,313 | B1 | 4/2019 | Bamberger et al. | |
| 10,534,203 | B2 | 1/2020 | Olgun et al. | |
| 2013/0235331 | A1 * | 9/2013 | Heinrich ................ | G02C 11/10 351/158 |
| 2015/0084584 | A1 | 3/2015 | Monks et al. | |

(Continued)

FOREIGN PATENT DOCUMENTS

| | | |
|---|---|---|
| CN | 201788316 U | 4/2011 |
| CN | 203301184 U | 11/2013 |

(Continued)

*Primary Examiner* — Alfonso Perez Borroto

(74) *Attorney, Agent, or Firm* — Young Basile Hanlon & MacFarlane, P.C.

(57) ABSTRACT

A wearable electronic device includes a lens, an inductive coil positioned around the lens, a storage device, and a transceiver. The inductive coil wirelessly charges the wearable electronic device and provides a data interface to send and receive wireless data signals. The storage device stores settings of the wearable electronic device and software that controls the wearable electronic device. The transceiver transmits an identifier of the wearable electronic device and receives a software update for the wearable electronic device, the software update based on the identifier of the wearable electronic device.

20 Claims, 6 Drawing Sheets

(56) References Cited

U.S. PATENT DOCUMENTS

| | | | | |
|---|---|---|---|---|
| 2016/0099614 | A1 | 4/2016 | Leabman et al. | |
| 2020/0133030 | A1* | 4/2020 | Eriksson ................ | G02C 11/10 |

FOREIGN PATENT DOCUMENTS

| | | | |
|---|---|---|---|
| CN | 204103540 | U | 1/2015 |
| CN | 106410990 | A | 2/2017 |
| CN | 110489137 | A | 11/2019 |
| JP | 5362073 | B2 | 12/2013 |
| WO | 2013142720 | A1 | 9/2013 |

* cited by examiner

WIRELESSLY CHARGEABLE WEARABLE ELECTRONIC DEVICE AND WIRELESS CHARGING CASE

CROSS-REFERENCE TO RELATED APPLICATION(S)

This application is a continuation of International Application Serial No. PCT/US2020/049762, filed Sep. 10, 2021, which claims priority to U.S. Provisional Application Ser. No. 63/091,562, filed Oct. 14, 2020, the contents of which are incorporated herein by reference.

TECHNICAL FIELD

This disclosure relates to wearable electronic devices, and in particular, to a wearable electronic device that can wirelessly receive power and data and a wireless charging case.

BACKGROUND

Wearable electronic devices, for example, a pair of glasses or a head-mounted display, are electronic devices that display computer-generated graphics to a user when participating in activities related to augmented, virtual, and/or mixed realities. A case for the wearable electronic device can be configured to store and charge the wearable electronic device. Wearable electronic devices and the cases that store and charge them can require cables and connectors to provide power and support communication.

SUMMARY

One aspect of the disclosed embodiments is a wearable electronic device that includes a lens, an inductive coil positioned around the lens, a storage device, and a transceiver. The inductive coil wirelessly charges the wearable electronic device and provides a data interface to send and receive wireless data signals. The storage device stores settings of the wearable electronic device and software that controls the wearable electronic device. The transceiver transmits an identifier of the wearable electronic device and receives a software update for the wearable electronic device, the software update based on the identifier of the wearable electronic device.

Another aspect of the disclosed embodiments is a case for a wearable electronic device that includes an interior portion to accommodate the wearable electronic device therein, a lid attached to the case, a first set of inductive coils positioned in the interior portion of the case, and a second set of inductive coils disposed on an outer surface of the lid. The first set of inductive coils wirelessly charges the wearable electronic device and provides a data interface between the wearable electronic device and the case when the wearable electronic device is positioned in the interior portion of the case. When the lid is in a closed position, one or more devices may be wirelessly charged by the second set of inductive coils when the devices are placed on a corresponding one of the second set of inductive coils.

Another aspect of the disclosed embodiments is a case for a wearable electronic device that includes an interior portion to accommodate the wearable electronic device therein, a sensor located on an exterior of the case, and a storage device. The sensor captures map information of a physical environment where the case is located. The storage device stores the map information captured by the sensor.

Another aspect of the disclosed embodiments is a method for wirelessly charging multiple devices positioned on a charging device. The charging device receives charging parameters from each device positioned on the charging device. The charging parameters include a current charge level, a target charge level, and a maximum charge level. The charging device selects a device positioned on the charging device with a highest charging priority. The charging device charges the selected device at a high power level until the selected device has reached its target charge level. The charging device charges devices other than the selected device that are positioned on the charging device at a low power level. The charging device charges the selected device at the low power level after the selected device has reached its target charge level and until the selected device has reached its maximum charge level.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
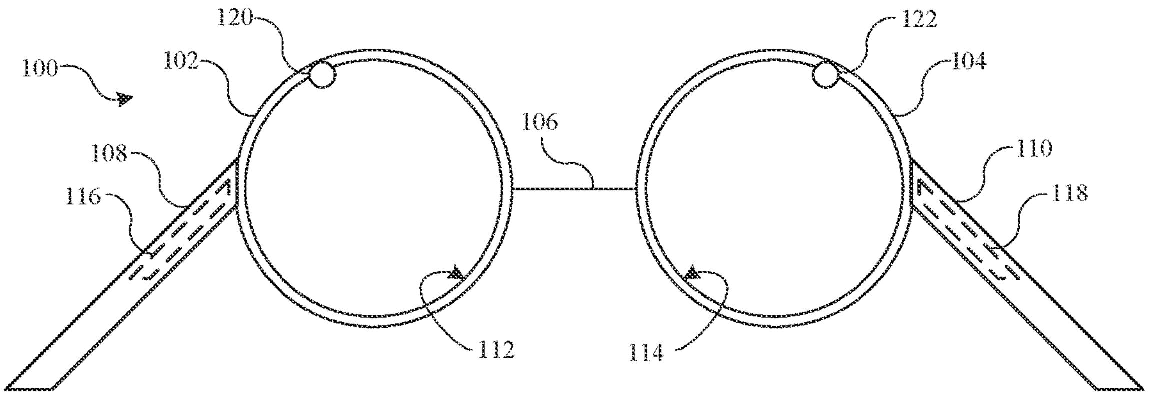
FIG. 1 is a diagram of a wearable electronic device in the form of glasses.

A wearable electronic device and a case for the wearable electronic device that can charge the wearable electronic device and additional devices are described herein. The wearable electronic device can be charged wirelessly by the case, and exposed connectors can be limited or absent from the wearable electronic device, reducing weight, improving portability, and limiting damage potential given the lack of cabling between the wearable electronic device and the case. The case can be configured to provide updates to the wearable electronic device and provide power according to a priority algorithm to charge both the wearable electronic device and other devices according to needs of the user. The case for the wearable electronic device can function as a portable power pack and replace the need for separate batteries or cables, reducing the number of components to be carried or accessed by the user of the wearable electronic device.

The wearable electronic device includes a lens, an inductive coil positioned around the lens, a storage device, and a transceiver. The inductive coil wirelessly charges the wearable electronic device and provides a data interface to send and receive wireless data signals. The storage device stores settings of the wearable electronic device and software that controls the wearable electronic device. The transceiver transmits an identifier of the wearable electronic device and receives a software update for the wearable electronic device, the software update based on the identifier of the wearable electronic device.

The case for the wearable electronic device includes an interior portion to accommodate the wearable electronic device therein, a lid attached to the case, a first set of inductive coils positioned in the interior portion of the case, and a second set of inductive coils disposed on an outer surface of the lid. The first set of inductive coils wirelessly charges the wearable electronic device and provides a data interface between the wearable electronic device and the case when the wearable electronic device is positioned in the interior portion of the case. When the lid is in a closed position, additional devices may be wirelessly charged by the second set of inductive coils when the additional devices are placed on a corresponding one of the second set of inductive coils.

The case may also include a sensor located on an exterior of the case and a storage device. The sensor captures map information of a physical environment where the case is located. The storage device stores the map information captured by the sensor. Alternatively, the sensor features of the case may be included in an embodiment of the case that does not include the second set of inductive coils.

A method for wirelessly charging multiple devices positioned on a charging device is also described herein. The charging device receives charging parameters from each device positioned on the charging device. The charging parameters include a current charge level, a target charge level, and a maximum charge level. The charging device selects a device positioned on the charging device with a highest charging priority. The charging device charges the selected device at a high power level until the selected device has reached its target charge level. The charging device charges devices other than the selected device that are positioned on the charging device at a low power level. The charging device charges the selected device at the low power level after the selected device has reached its target charge level and until the selected device has reached its maximum charge level.

FIG. 1 is a diagram of a wearable electronic device 100 in the form of glasses. As an example, the wearable electronic device 100 may be a device that is configured to display computer-generated content to a user in conjunction with a view of a physical environment around the user. The wearable electronic device 100 includes a first lens 102 and a second lens 104 connected by a nosepiece 106. A first arm 108 extends away from the first lens 102. A second arm 110 extends away from the second lens 104. The first lens 102 includes a first inductive coil 112. The second lens 104 includes a second inductive coil 114. In some examples, a single inductive coil (not shown) is present and surrounds either the first lens 102 or the second lens 104.

The first inductive coil 112 and/or the second inductive coil 114 are used in connection with corresponding inductive coil(s) of a separate device (some examples of a separate device are described below) to provide wireless power and a wireless data link (by sending and receiving wireless data signals) in accordance with inductive charging principles. In some implementations, the wireless data link may be established according to a data communications protocol such as Universal Serial Bus (USB) or near-field communications (NFC). In some implementations, the first inductive coil 112 and the second inductive coil 114 may function as an antenna.

In some implementations, the first inductive coil 112 and the second inductive coil 114 are made of one or more wire loops. In some implementations, the first inductive coil 112 surrounds a see-through portion of the first lens 102 and the second inductive coil 114 surrounds a see-through portion of the second lens 104. In some implementations, the first inductive coil 112 and the second inductive coil 114 may take different shapes, provided that the positioning of the first inductive coil 112 and the second inductive coil 114 does not interfere with the user wearing the wearable electronic device 100 from seeing through the first lens 102 and the second lens 104.

In some implementations, the wearable electronic device 100 includes electronic components 116, 118 (shown by dashed lines in FIG. 1). The electronic components 116, 118 may include a battery, a processor, a storage device, a transceiver, and control electronics. The electronic components 116, 118 are not individually shown for simplicity. The electronic components 116, 118 may be positioned in the first arm 108, in the second arm 110, or in both the first arm 108 and the second arm 110 as shown. The electronic components 116, 118 are connected to the first inductive coil 112 and the second inductive coil 114 via wiring extending through the first arm 108 and/or the second arm 110. In some implementations, the electronic components 116, 118 may be connected to the first inductive coil 112 and the second inductive coil 114 by an electromagnetic connection or by an electrical connection.

The battery may be charged by power received via the first inductive coil 112 and/or the second inductive coil 114. The battery may provide power to the processor, the storage device, the transceiver, and the control electronics. The transceiver may send and receive data via the first inductive coil 112 and/or the second inductive coil 114. In some implementations, the processor may cause data to be sent and received via the first inductive coil 112 and/or the second inductive coil 114. In some implementations, the wearable electronic device 100 may include a frame (not shown) that surrounds the first lens 102 and the second lens 104, and the first inductive coil 112 and the second inductive coil 114 may be embedded in the frame.

In some implementations, the wearable electronic device 100 includes display components 120, 122 which may be powered by the battery. As shown in FIG. 1, the display component 120 is located on an upper portion of the first lens 102 and the display component 122 is located on an upper portion of the second lens 104. In some implementations, the display components 120, 122 may be located in other positions provided that the display components 120, 122 are located adjacent to the first lens 102 and the second lens 104. In some implementations, the display components 120, 122 are light emitting display components coupled with an optical combiner (not shown) included in the first lens 102 and the second lens 104 to overlay content (via emitted light) onto a physical environment scene that the user sees through the first lens 102 and the second lens 104. In some implementations, only one of the display components 120, 122 is present. In some implementations, the display components 120, 122 may have a different shape than that shown in FIG. 1, but the shape of the display components 120, 122 does not affect the operation of the display components 120, 122.

Figure 2:
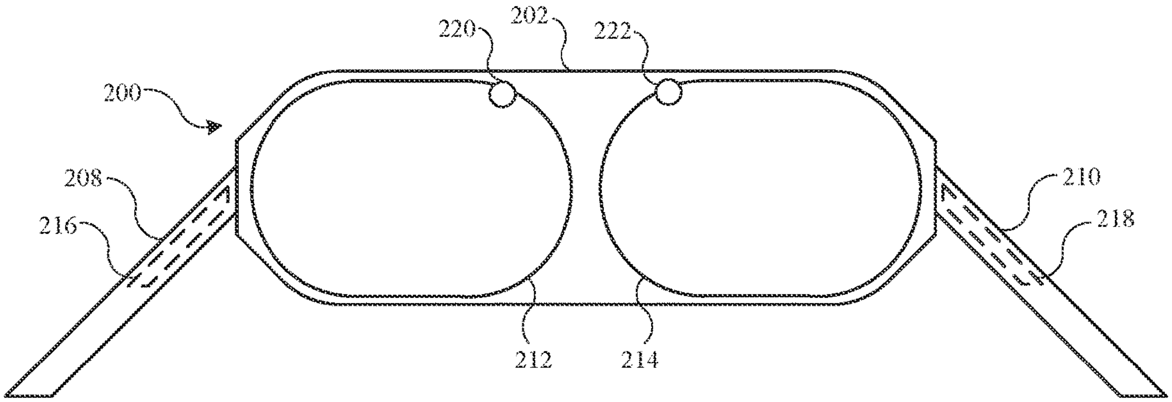
FIG. 2 is a diagram of a wearable electronic device in the form of goggles.

FIG. 2 is a diagram of a wearable electronic device 200 in the form of goggles, for example, sports goggles or a diving mask. The wearable electronic device 200 may be a device that is configured to display computer-generated content to a user in conjunction with a view of a physical environment around the user. The wearable electronic device 200 includes a lens 202. In some implementations, the lens 202 is shaped to accommodate the user's nose in the middle of the lower portion of the lens 202. A first arm 208 extends away from one side of the wearable electronic device 200 and a second arm 210 extends away from an opposite side of the wearable electronic device 200.

A first inductive coil 212 is positioned on one end of the lens 202 and a second inductive coil 214 is positioned on an opposite end of the lens 202. The first inductive coil 212 and the second inductive coil 214 are used in connection with corresponding inductive coils of a separate device (some examples of a separate device are described below) to provide wireless power and a wireless data link (by sending and receiving wireless data signals) in accordance with inductive charging principles. In some implementations, the wireless data link may be established according to a data communications protocol such as Universal Serial Bus (USB) or near-field communications (NFC). In some implementations, the first inductive coil 212 and the second inductive coil 214 may function as an antenna.

The first inductive coil 212 and the second inductive coil 214 are positioned such that when the user is wearing the wearable electronic device 200, the user can see through the lens 202 without having their vision obstructed by the first inductive coil 212 or the second inductive coil 214. In some implementations, the first inductive coil 212 and the second inductive coil 214 are made of one or more wire loops. In some implementations, the first inductive coil 212 and the second inductive coil 214 may take different shapes, provided that the positioning of the first inductive coil 212 and the second inductive coil 214 does not interfere with the user from seeing through the lens 202. In some implementations, there may be only one inductive coil (not shown) in the wearable electronic device 200.

In some implementations, the wearable electronic device 200 includes electronic components 216, 218 (shown by dashed lines in FIG. 2). The electronic components 216, 218 may include a battery, a processor, a storage device, a transceiver, and control electronics. The electronic components 216, 218 are not individually shown for simplicity. The electronic components 216, 218 may be positioned in the first arm 208, in the second arm 210, or in both the first arm 208 and the second arm 210. The electronic components 216, 218 are connected to the first inductive coil 212 and the second inductive coil 214 via wiring extending through the first arm 208 and/or the second arm 210. In some implementations, the electronic components 216, 218 may be connected to the first inductive coil 212 and the second inductive coil 214 by an electromagnetic connection or by an electrical connection.

The battery may be charged by power received via the first inductive coil 212 and/or the second inductive coil 214. The battery may provide power to the processor, the storage device, the transceiver, and the control electronics. The transceiver may send and receive data via the first inductive coil 212 and/or the second inductive coil 214. In some implementations, the processor may cause data to be sent and received via the first inductive coil 212 and/or the second inductive coil 214. In some implementations, the wearable electronic device 200 may include a frame that surrounds the lens 202, and the first inductive coil 212 and/or the second inductive coil 214 may be embedded in the frame.

In some implementations, the wearable electronic device 200 includes display components 220, 222 which may be powered by the battery. As shown in FIG. 2, the display component 220 is located on an upper left portion of the lens 202 and the display component 222 is located on an upper right portion of the lens 202. In some implementations, the display components 220, 222 may be located in other positions provided that the display components 220, 222 are located adjacent to the lens 202. In some implementations, the display components 220, 222 are light emitting display components coupled with an optical combiner (not shown in FIG. 2) included in the lens 202 to overlay content (via emitted light) onto a physical environment scene that the user sees through the lens 202. In some implementations, only one of the display components 220, 222 is present. In some implementations, the display components 120, 122 may have a different shape than that shown in FIG. 1, but the shape of the display components 120, 122 does not affect the operation of the display components 120, 122.

In some implementations, the wearable electronic devices 100, 200 include associated control software. The control software may be stored in the storage device and executed by the processor or the control electronics. The transceiver in the wearable electronic devices 100, 200 transmits an identifier associated with the wearable electronic devices 100, 200 via the inductive coils to receive a software update that is specific to the wearable electronic devices 100, 200. The wearable electronic devices 100, 200 then receive the software update via the inductive coils and the transceiver. In some implementations, the processor in the wearable electronic devices 100, 200 causes the inductive coils to transmit an identifier associated with the wearable electronic devices 100, 200 to receive a software update that is specific to the wearable electronic devices 100, 200. The wearable electronic devices 100, 200 then receive the software update via the inductive coils.

In some implementations, different configurations of the wearable electronic devices 100, 200 have different identifiers so that a software update received by the wearable electronic devices 100, 200 is specific to that configuration of the wearable electronic devices 100, 200. Different software updates can thus be received by the wearable electronic devices 100, 200 based on the different identifiers. For example, the wearable electronic device 100 may include a feature to automatically tint the lenses 102, 104 based on an amount of ambient light. If the wearable electronic device 200 does not include this feature, the wearable electronic device 200 does not need to receive a software update relating to this feature.

By customizing the software update based on the configuration of the wearable electronic devices 100, 200, a user of the wearable electronic devices 100, 200 may receive a smaller software update which may be received by the wearable electronic devices 100, 200 faster than a more general software update that includes updates for all possible features and configurations of the wearable electronic devices 100, 200 even if the user's wearable electronic devices 100, 200 do not include such features. Providing a smaller software update is beneficial to a user of the wearable electronic devices 100, 200 if the wearable electronic devices 100, 200 include a low-speed data interface because the update will be received faster by the wearable electronic devices 100, 200. In some implementations, settings of the wearable electronic device 100, 200 may be updated in a similar manner as a software update, utilizing the respective identifiers of the wearable electronic devices 100, 200 to ensure that the settings specific to the wearable electronic devices 100, 200 are updated.

It is noted that in some implementations, using the identifier in conjunction with the wearable electronic device to receive a device-specific software update may be used in other wearable electronic devices other than the wearable electronic devices 100, 200. For example, using the identifier to receive a device-specific software update may be used with any type of wearable electronic device that is capable of presenting a computer-generated environment to a user of the wearable electronic device, such as a device including a housing with content display components and inductive coils (e.g., a virtual reality (VR) headset).

Figure 3:
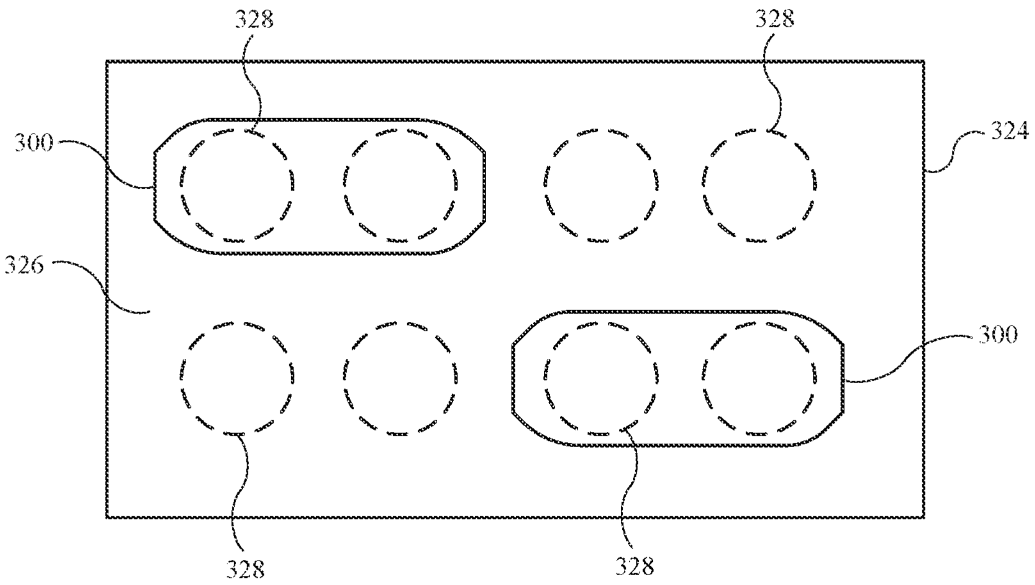
FIG. 3 is a top view of a charging device while charging two wearable electronic devices.

FIG. 3 is a top view of a charging device 324 that is charging two electronic devices 300. The charging device 324 is a powered device capable of providing wireless power and/or wireless data to a corresponding device that is configured to receive wireless power and/or wireless data (i.e., the electronic devices 300). As an example, the charging device 324 may be a charging mat or a laptop computer. The charging device 324 has an outer surface 326 with multiple inductive coils 328. In some implementations, the inductive coils 328 may be made of one or more wire loops. The inductive coils 328 are positioned relative to the outer surface 326 so that the inductive coils 328 can establish an inductive charging and/or data communication connection with the electronic devices 300 when the inductive coils of electronic devices 300 are placed on corresponding inductive coils 328 on the outer surface 326.

As an example, the inductive coils 328 may be located under a material (e.g., glass, plastic, synthetic rubber, textile, aluminum, etc.) that makes up the outer surface 326. As an example, the inductive coils 328 may be embedded in a material that defines the outer surface 326. The number of inductive coils 328 included in the charging device 324 may vary and may correspond in size and shape to the inductive coils in the electronic devices 300. In some implementations, the outer surface 326 may include visual indicators to identify where the inductive coils 328 are located and to enable proper placement of the electronic devices 300 on the inductive coils 328. The electronic devices 300 may include the wearable electronic devices 100, 200, the cases 530, 630, 730, 930, 1030, or other wirelessly chargeable devices such as the wirelessly chargeable devices 748, 750 described herein. The two electronic devices 300 shown in FIG. 3 are exemplary and the number of electronic devices 300 that may be charged by the charging device 324 corresponds to the number of inductive coils 328 included in the charging device 324.

Figure 4:
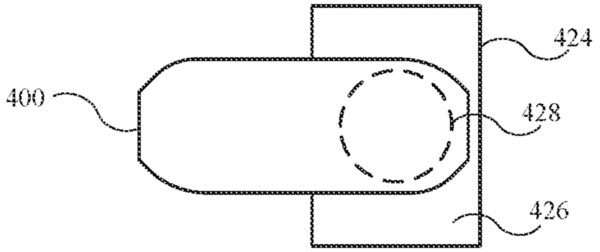
FIG. 4 is a top view of a charging device while charging one wearable electronic device.

FIG. 4 is a top view of a charging device 424 that is charging a single electronic device 400. The electronic device 400 may include the wearable electronic devices 100, 200, the cases 530, 630, 730, 930, 1030, or other wirelessly chargeable devices such as the wirelessly chargeable devices 748, 750 described herein. The charging device 424 is a powered device capable of providing wireless power and/or wireless data to a corresponding device that is configured to receive wireless power and/or wireless data (i.e., the electronic device 400). As an example, the charging device 424 may be a charging mat or a cellular telephone. The charging device 424 has an outer surface 426 with one inductive coil 428. In some implementations, the inductive coil 428 may be made of one or more wire loops. The inductive coil 428 is positioned relative to the outer surface 426 so that the inductive coil 428 can establish an inductive charging and/or data communication connection with the electronic device 400 when an inductive coil of the electronic device 400 is placed on the inductive coil 428 on the outer surface 426.

As an example, the inductive coil 428 may be located under a material (e.g., glass, plastic, synthetic rubber, textile, aluminum, etc.) that makes up the outer surface 426. As another example, the inductive coil 428 may be embedded in a material that defines the outer surface 426. The inductive coil 428 is sized and shaped such that when the electronic device 400 is placed on the inductive coil 428, the inductive coil(s) of the electronic device 400 at least partially overlaps the inductive coil 428. In some implementations, the outer surface 426 may include a visual indicator (not shown) to identify where the inductive coil 428 is located to enable proper placement of the electronic device 400 on the inductive coil 428.

Figure 5:
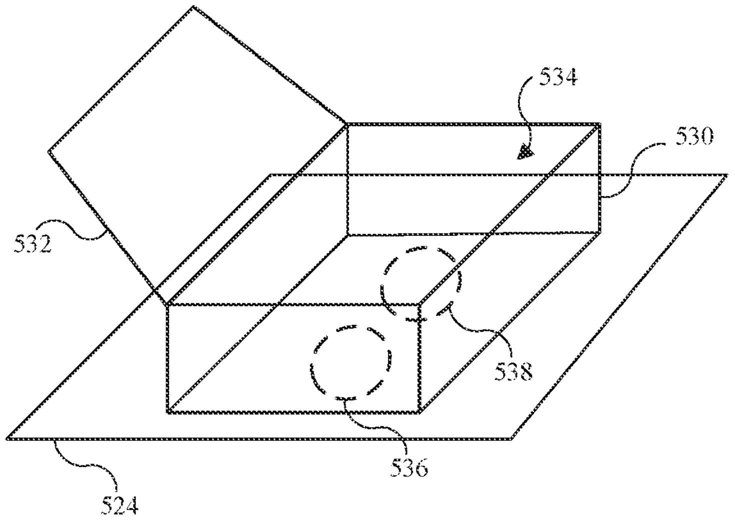
FIG. 5 is a diagram of a case for charging a wearable electronic device with a lid in an open position.

FIG. 5 is a diagram of a case 530 for charging a wearable electronic device with a lid 532 in an open position. The case 530 is positioned in contact with a charging device 524. The wearable electronic device is not shown in FIG. 5 to avoid obscuring the features described herein, though can be similar to the wearable electronic device 100 or the wearable electronic device 200. An interior portion 534 of the case 530 includes a first inductive coil 536 and a second inductive coil 538. In some implementations, the first inductive coil 536 and the second inductive coil 538 may be made of one or more wire loops. The interior portion 534 of the case 530 is sized and shaped to accommodate the wearable electronic device therein when the lid 532 is in a closed position.

The charging device 524 is a powered device capable of providing wireless power and/or wireless data to the case 530 while the case 530 rests on the charging device 524. That is, the case 530 (as well as other electronic devices, not shown) may be configured to receive wireless power and/or wireless data from the charging device 524 upon contact between the case 530 and the charging device 524. As an example, the charging device 524 may be a charging mat, a laptop computer, or another electronic device (not shown).

The first inductive coil 536 and the second inductive coil 538 within the case 530 are sized and shaped to correspond with the inductive coils in the wearable electronic device. When the wearable electronic device is placed in the interior portion 534 and the inductive coils of the wearable electronic device are placed on the first inductive coil 536 and the second inductive coil 538, the wearable electronic device may be wirelessly charged by the case 530 and/or receive data from the case 530. In some implementations, the interior portion 534 may include a visual indicator (not shown) to identify where the first inductive coil 536 and the second inductive coil 538 are located to enable proper placement of the wearable electronic device.

In some implementations, the interior portion 534 may be configured (for example, by including contours to the interior portion 534) so that when the wearable electronic device is positioned in the interior portion 534, the inductive coils of the wearable electronic device are precisely aligned with the first inductive coil 536 and the second inductive coil 538. By having a precise alignment between the inductive coils of the wearable electronic device and the first inductive coil 536 and the second inductive coil 538, the wireless charging and/or the wireless data transfer will be more efficient (e.g., a faster power transfer and/or a faster data transfer).

Figure 6:
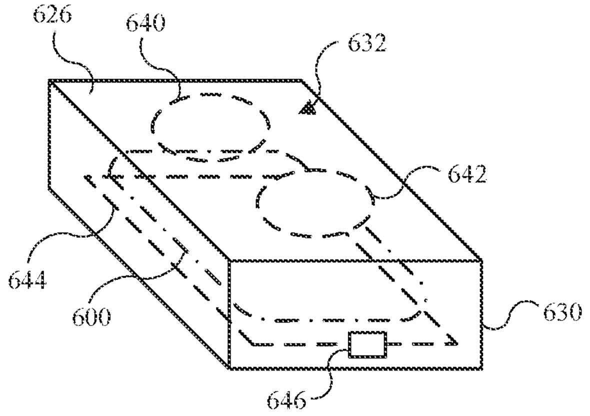
FIG. 6 is a partial see-through diagram of a case for charging a wearable electronic device with a lid in a closed position.

FIG. 6 is a partial see-through diagram of a case 630 for charging a wearable electronic device 600 with a lid 632 in a closed position. The wearable electronic device 600 may be similar to the wearable electronic device 100 or the wearable electronic device 200. The lid 632 has an outer surface 626 with a first inductive coil 640 and a second inductive coil 642. In some implementations, the first inductive coil 640 and the second inductive coil 642 may be made of one or more wire loops. The first inductive coil 640 and the second inductive coil 642 are positioned relative to the outer surface 626 so that the first inductive coil 640 and the second inductive coil 642 can establish an inductive charging and/or data communication connection with an electronic device (not shown in FIG. 6) when an inductive coil of the electronic device is placed on the corresponding first inductive coil 640 and/or the second inductive coil 642 on the outer surface 626.

As an example, the first inductive coil 640 and the second inductive coil 642 may be located under a material (e.g., glass, plastic, synthetic rubber, textile, aluminum, etc.) that makes up the outer surface 626. As an example, the first inductive coil 640 and the second inductive coil 642 may be embedded in a material that defines the outer surface 626. In some implementations, the outer surface 626 may include visual indicators to identify where the first inductive coil 640 and the second inductive coil 642 are located, to enable proper placement of the electronic device(s) on the first inductive coil 640 and the second inductive coil 642. In some implementations, the outer surface 626 may include one inductive coil or more than two inductive coils.

A battery 644 is located at a bottom of an interior portion of the case 630 (shown in FIG. 6 by a dashed outline). The wearable electronic device 600 is shown in FIG. 6 in the interior portion of the case 630 (shown by a dash-dot outline) and is positioned on inductive coils located in the interior portion of the case 630 and above the battery 644 (the inductive coils are not shown in FIG. 6). A power cable connector 646 is located on an exterior of the case 630 and is sized and shaped to receive a power cable. Additional electronics in the case 630 (not shown in FIG. 6) provide power from the power cable connector 646 to the battery 644, to the inductive coils in the interior portion of the case 630, and to the first inductive coil 640 and the second inductive coil 642. The case 630 may simultaneously provide wireless power to the wearable electronic device 600 and any devices (not shown, such as mobile devices, music players, wireless speakers, etc.) placed on the first inductive coil 640 and/or the second inductive coil 642. The case 630 may also be configured for wireless charging, for example, using a charging device (not shown) similar to the charging devices 324, 424, 524.

Figure 7:
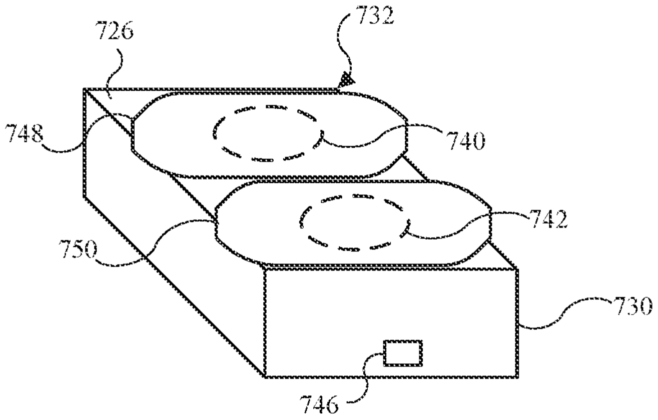
FIG. 7 is a diagram of a case for charging a wearable electronic device with a lid in a closed position and two wirelessly chargeable devices being charged on the lid.

FIG. 7 is a diagram of a case 730 for charging a wearable electronic device (not shown) with a lid 732 in a closed position and two wirelessly chargeable devices 748, 750 being charged on an outer surface 726 of the lid 732. The case 730 may be constructed in a similar manner as the case 630 and may include a battery therein (not shown). A power cable connector 746 is located on an exterior of the case 730 and is sized and shaped to receive a power cable (not shown). The case 730 may also be configured for wireless charging, for example, using a charging device (not shown) similar to the charging devices 324, 424, 524.

The outer surface 726 includes a first inductive coil 740 and a second inductive coil 742. In some implementations, the first inductive coil 740 and the second inductive coil 742 may be made of one or more wire loops. The first inductive coil 740 and the second inductive coil 742 are positioned relative to the outer surface 726 so that the first inductive coil 740 and the second inductive coil 742 can establish an inductive charging and/or data communication connection with the wirelessly chargeable devices 748, 750 when respective inductive coils (not shown) of the wirelessly chargeable devices 748, 750 are placed on the corresponding first inductive coil 740 and/or the second inductive coil 742 on the outer surface 726. The wirelessly chargeable devices 748, 750 may include mobile devices, music players, wireless speakers, etc.

As an example, the first inductive coil 740 and the second inductive coil 742 may be located under a material (e.g., glass, plastic, synthetic rubber, textile, aluminum, etc.) that makes up the outer surface 726. As an example, the first inductive coil 740 and the second inductive coil 742 may be embedded in a material that defines the outer surface 726. In some implementations, the outer surface 726 may include visual indicators (not shown) to identify where the first inductive coil 740 and the second inductive coil 742 are located to enable proper placement of the wirelessly chargeable devices 748, 750 on the first inductive coil 740 and the second inductive coil 742. The number of wirelessly chargeable devices that may be charged or may receive data by placing the devices on the outer surface 726 corresponds to a number of inductive coils on the outer surface 726. For purposes of illustration, only two wirelessly chargeable devices 748, 750 are shown in FIG. 7.

Figure 8:
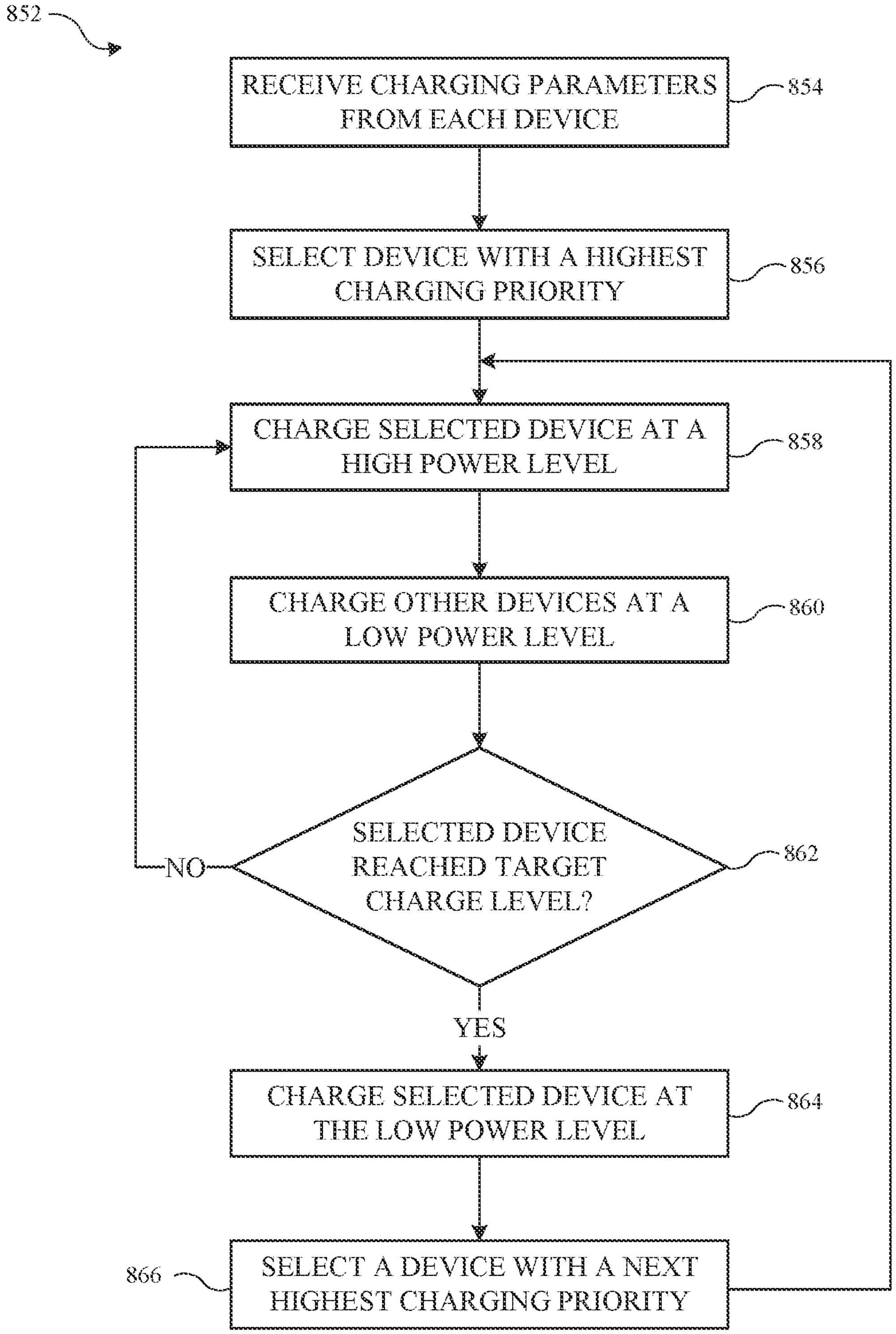
FIG. 8 is a flowchart of a method for charging multiple devices positioned on a charging device.

FIG. 8 is a flowchart of a method 852 for charging multiple devices positioned on a charging device. The method 852 may be implemented in connection with a charging device capable of charging multiple devices, such as the charging devices 324, 524, the case 630, or the case 730. The devices to be charged by the charging device may include the wearable electronic devices 100, 200, 600, the electronic device 300, the cases 530, 630, 730 (for example, when charged using the charging devices 324, 524), or the wirelessly chargeable devices 748, 750.

As devices are positioned on the charging device, the charging device receives charging parameters from each device (operation 854). The charging device may receive the charging parameters via inductive coils or other wireless protocols (e.g., WiFi or Bluetooth®) if the charging device includes the corresponding equipment. The charging parameters for each device include a current charge level of the device, a target charge level for the device, and a maximum charge level of the device. In some implementations, the charging parameters may also include an identifier of the device.

The charging device selects a device with a highest charging priority (operation 856). In some implementations, the highest charging priority is assigned to the device with a lowest current charge level. In some implementations, the highest charging priority is assigned based on the identifier of the device. In some implementations, the highest charging priority is assigned to the wearable electronic device 100, the wearable electronic device 200, the electronic device 300, or the wearable electronic device 600, if present. In some implementations, the highest charging priority is assigned to the case 530, the case 630, or the case 730, if present.

The selected device with the highest charging priority is charged at a high power level (operation 858). The other devices positioned on the charging device are charged at a low power level (operation 860). The high power level provides more power than the low power level so that the device being charged at the high power level charges faster than devices being charged at the low power level. When the charging device is charging multiple devices, it may not be possible for the charging device to provide a same power level to all of the devices for charging, for example, due to a total maximum power draw of the charging device or due to heat dissipation constraints of the charging device. By differentiating between the devices based on the charging priority of the devices, the high power level, and the low power level, the charging device is able to provide at least some power to all of the devices positioned on the charging device.

If the selected device has not reached its target charge level (operation 862), then the selected device remains charging at the high power level (operation 858) and the other devices remain charging at the low power level (operation 860). Once the selected device has reached its target charge level (operation 862), then the selected device is charged at the low power level (operation 864) and the device with a next highest priority level is selected (operation 866). The device with the next highest priority level is then charged at the high power level (operation 858) and the method 852 continues, selecting each device positioned on the charging device for the high power level, until all devices positioned on the charging device have been charged to their maximum charge levels.

In some implementations, the charging device may support additional communication protocols (e.g., WiFi or Bluetooth®) to enable the charging device to receive the charging parameters from devices that do not support wireless data transfer via the inductive coils. In some implementations, the target charge level is 80% of the maximum charge level. In some implementations, the charging device includes a user interface so that a user may be alerted when a device has reached its target charge level and/or its maximum charge level.

Figure 9:
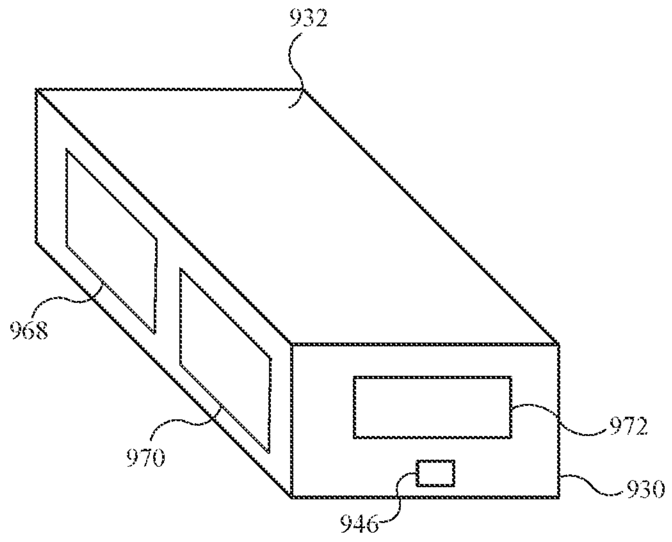
FIG. 9 is a diagram of a case for charging a wearable electronic device with sensors located on an exterior of the case.

FIG. 9 is a diagram of a case 930 for charging an electronic device (e.g., the wearable electronic device 100, the wearable electronic device 200, the electronic device 300, or the electronic device 400). A lid 932 of the case 930 is shown in a closed position. A power cable connector 946 is located on an exterior of the case 930 and is sized and shaped to receive a power cable (not shown). The case 930 may receive power wirelessly, for example, using a charging device (not shown) such as the charging devices 324, 424, 524. One or more sensors 968, 970, 972 are positioned in different places on the exterior of the case 930. The number of sensors shown in FIG. 9 is exemplary, and any number of sensors, in any size and shape, may be located on the exterior of the case 930.

The sensors 968, 970, 972 are used to capture features of a physical environment where the case 930 is located. For example, if the case 930 is located in a room of a home, the sensors 968, 970, 972 may capture the location of furniture in the room to "map" the room for a computer-generated environment by capturing map information for use by the wearable electronic device that receives updates from the case 930. The map information may be in any format usable by the wearable electronic device in connection with rendering the computer-generated environment. The sensors 968, 970, 972 may be audio or video sensors, for example, or may include a visible spectrum camera, an infrared camera, a depth camera, or a LiDAR sensor.

In some implementations, when the case 930 has completed mapping the room, the case 930 wirelessly transmits the map information to the wearable electronic device. By using the sensors 968, 970, 972 on the case 930 to map the room, a user of the wearable electronic device may be placed into a computer-generated environment as soon as the wearable electronic device is worn and the user does not need to wait for the wearable electronic device to separately map the room using sensors that are located on the wearable electronic device. In some implementations, the case 930 includes a storage device (not shown) that stores the map information for later transmission to the wearable electronic device (for example, a next time the wearable electronic device is placed in the case 930 or is located near the case 930). In some implementations, if the physical environment has changed, the sensors 968, 970, 972 may detect the changes, update the map information with the changes, and store the updated map information. In some implementations, the updated map information is stored separately as a smaller update to enable a faster update for the wearable electronic device.

Figure 10:
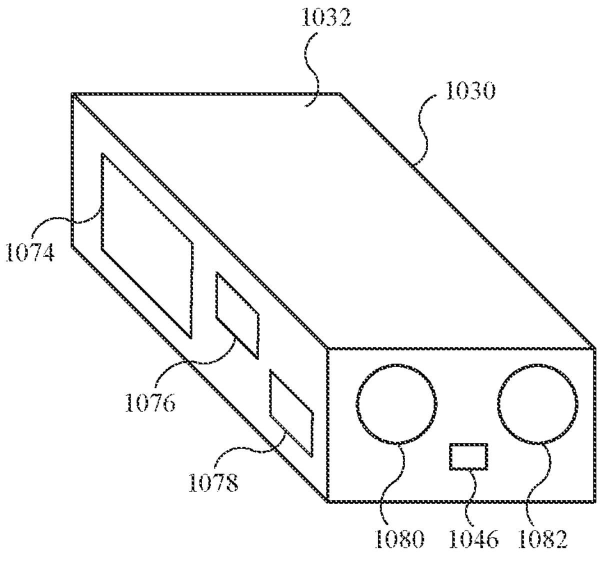
FIG. 10 is a diagram of a case for charging a wearable electronic device with user interface elements located on an exterior of the case.

FIG. 10 is a diagram of a case 1030 for charging an electronic device (e.g., the wearable electronic device 100, the wearable electronic device 200, the electronic device 300, or the electronic device 400). A lid 1032 of the case 1030 is shown in a closed position. A power cable connector 1046 is located on the exterior of the case 1030 and is sized and shaped to receive a power cable (not shown). The case 1030 may receive power wirelessly, for example, using a charging device (not shown) such as the charging devices 324, 424, 524.

Several user interface elements are located on an exterior of the case 1030. For example, a display 1074, a first control component 1076, a second control component 1078, a microphone 1080, and a speaker 1082 may be located on the exterior of the case 1030. The display 1074 may include a touchscreen display. The first control component 1076 and the second control component 1078 may be, for example, a touch control, a button, a switch, an indicator light, or a haptic feedback element. The microphone 1080 and the speaker 1082 may be used to interact with a voice controlled system. The user interface elements 1074-1082 shown in FIG. 10 are exemplary in size, shape, and function, and additional or different user interface elements may be located on the exterior of the case 1030. The user interface elements 1074-1082 permit a user to receive information relating to the case 1030, the wearable electronic device (e.g., as stored within the case 1030), or general information, and to interact with features of the case 1030 or the wearable electronic device.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment includes a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person using the system perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person using the system indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person using the system perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

As described above, one aspect of the present technology is the gathering and use of data available from various sources to present a CGR environment to a user of a wearable electronic device or to facilitate the user's interaction with the wearable electronic device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver an update to settings, software and/or the CGR environment on the user's wearable electronic device. Accordingly, use of such personal information data enables users to maintain and update their wearable electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of presenting a CGR environment to a user of the wearable electronic device, the present technology can be configured to allow users to select to “opt in” or “opt out” of participation in the collection of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a delivered CGR environment can be presented to users by inferring preferences based on non-personal information data or a bare minimum amount of personal information, such as the content being requested by the wearable electronic device associated with a user, other non-personal information, or publicly available information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A case for a wearable electronic device that includes a lens and an inductive coil positioned around the lens, the case comprising;

an inductive coil configured to wirelessly charge the wearable electronic device via the inductive coil of the wearable electronic device and to provide a data interface between the case and the wearable electronic device;

a sensor located on an exterior of the case and configured to capture information associated with an environment of the case;

a storage device configured to store settings of the wearable electronic device and software that controls the wearable electronic device; and a processor configured to:

receive an identifier of the wearable electronic device; and send a software update for the wearable electronic device, the software update based on the identifier of the wearable electronic device.

2. The case of claim 1, wherein the identifier relates to a configuration of the wearable electronic device and the software update is specific to the configuration of the wearable electronic device.

3. The case of claim 1, the wearable electronic device further comprising a frame, wherein the lens inductive coil is embedded in the frame and surrounds the lens.

4. The case of claim 1, wherein the wearable electronic device is glasses and further comprises a frame configured to secure two lenses.

5. A case for a wearable electronic device, comprising:

an interior portion to accommodate the wearable electronic device therein;

a lid attached to the case;

a first set of inductive coils positioned in the interior portion of the case to wirelessly charge the wearable electronic device and to provide a data interface between the wearable electronic device and the case when the wearable electronic device is positioned in the interior portion of the case; and a second set of inductive coils disposed on an outer surface of the lid such that when the lid is in a closed position, the second set of inductive coils is configured to wirelessly charge one or more devices when placed on a corresponding one of the second set of inductive coils.

6. The case of claim 5, wherein the interior portion is sized and shaped such that when the wearable electronic device is positioned in the interior portion of the case, an inductive coil of the wearable electronic device is precisely aligned with the first set of inductive coils.

7. The case of claim 5, further comprising:

a user interface element located on an exterior of the case and configured to allow a user to interact with a feature of the case or the wearable electronic device.

8. The case of claim 7, wherein the user interface element includes any one or more of: a display, a touchscreen, a touch control, a button, a switch, an indicator light, a haptic feedback element, a microphone, or a speaker.

9. The case of claim 7, wherein the case includes two or more user interface elements.

10. A case for a wearable electronic device, comprising:

an interior portion to accommodate the wearable electronic device therein;

at least one inductive coil configured to wirelessly charge the wearable electronic device and to provide a data interface between the wearable electronic device and the case;

a sensor located on an exterior of the case and configured to capture map information of a physical environment where the case is located; and a storage device configured to store the map information captured by the sensor.

11. The case of claim 10, wherein the case includes two or more sensors.

12. The case of claim 10, wherein when the wearable electronic device is positioned in the interior portion of the case, the map information is transmitted from the storage device to the wearable electronic device.

13. The case of claim 10, wherein when the wearable electronic device is located near the case, the map information is transmitted from the storage device to the wearable electronic device.

14. The case of claim 10, wherein the map information is used to update stored map information in the wearable electronic device.

15. The case of claim 14, wherein only updated map information is transmitted to the wearable electronic device.

16. A method for wirelessly charging multiple devices positioned on a charging device, comprising:

receiving charging parameters from each device positioned on the charging device by the charging device, the charging parameters including:

a current charge level;

a target charge level; and a maximum charge level;

selecting a device positioned on the charging device with a highest charging priority by the charging device;

charging the selected device at a high power level until the selected device has reached its target charge level;

charging devices other than the selected device that are positioned on the charging device at a low power level; and charging the selected device at the low power level after the selected device has reached its target charge level and until the selected device has reached its maximum charge level.

17. The method of claim 16, wherein the highest charging priority is assigned to a device having a lowest current charge level.

18. The method of claim 16, wherein the charging parameters further include an identifier of the device.

19. The method of claim 18, wherein the highest charging priority is based on the identifier of the device.

20. The method of claim 18, wherein the highest charging priority is based on a current charge level of the device and the identifier of the device.

* * * * *